(12) United States Patent
Mochihara (10) Patent No.: US 8,776,636 B2
(45) Date of Patent: Jul. 15, 2014

(54) VIBRATION DAMPING DEVICE AND POWER TRANSMISSION DEVICE

(75) Inventor: Takahiro Mochihara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 423 days.

(21) Appl. No.: 12/408,819

(22) Filed: Mar. 23, 2009

(65) Prior Publication Data

US 2009/0258749 A1    Oct. 15, 2009

(30) Foreign Application Priority Data

Apr. 14, 2008  (JP) ................................. 2008-104881

(51) Int. Cl.
| | | |
|---|---|---|
| F16F 15/10 | (2006.01) | |
| F16F 15/14 | (2006.01) | |
| F16F 15/30 | (2006.01) | |
| F16F 15/315 | (2006.01) | |
| F16F 15/22 | (2006.01) | |
| F16H 57/02 | (2012.01) | |

(52) U.S. Cl.
USPC ................. 74/572.2; 74/573.13; 74/572.21; 74/574.4; 74/433.5; 464/180; 180/381

(58) Field of Classification Search
USPC ............ 74/572.2, 572.21, 606 R, 607, 433.5, 74/573.13, 574.4; 464/127, 180; 475/230, 475/231, 248, 249; 180/374, 375, 378, 381
See application file for complete search history.

(56) References Cited

U.S. PATENT DOCUMENTS 2,058,802 A * 10/1936 Kamper ...................... 74/606 R
2,824,467 A * 2/1958 O'Connor .................. 74/573.13

(Continued)

FOREIGN PATENT DOCUMENTS

| JP | 05083503 U | 11/1993 |
| JP | 06174014 A * | 6/1994 |

(Continued)

OTHER PUBLICATIONS

JP,10-306844,A(1998). Japanese Patent Office: AIPN. http://dossier1.ipdl.inpit.go.jp/AIPN/odse_call_transl.ipdl?N0000=7413&N0005=Ei7BzenZVnBvfz7D1ZIK&N0120=01&N2001=2&N3001=1998-306844&Ntt3=machineV14&Ntt4=autoV14&Ntt5=logisticsV14&Ntt6=&Ntt7=&Ntt8=&Ntt9=&Ntt10=&Ntt11=&Ntt12=.*

(Continued)

*Primary Examiner* — Daniel Yabut
(74) *Attorney, Agent, or Firm* — Gifford, Krass, Sprinkle, Anderson & Citkowski, P.C.

(57) ABSTRACT

A vibration damping device is equipped with a mass body disposed spaced apart from a rotational center axis of a rotary shaft by a certain distance, and a rolling bearing that rotatably supports the mass body with respect to the rotary shaft and holds a support posture of the mass body with respect to the rotational center axis of the rotary shaft constant.

5 Claims, 9 Drawing Sheets

(56) References Cited

U.S. PATENT DOCUMENTS

| | | | |
|---|---|---|---|
| 2,895,315 A * | 7/1959 | Fishtahler | 464/180 |
| 2,966,074 A * | 12/1960 | Rumsey | 74/573.13 |
| 3,049,941 A * | 8/1962 | Rumsey | 74/573.13 |
| 3,887,024 A * | 6/1975 | Takahashi et al. | 180/381 |
| 4,046,030 A * | 9/1977 | Suzuki | 464/180 |
| 4,263,881 A * | 4/1981 | Isobe et al. | 464/180 |
| 4,563,605 A * | 1/1986 | Gerber | 464/180 |
| 4,617,884 A * | 10/1986 | Allen et al. | 464/180 |
| 4,677,871 A * | 7/1987 | Taniyama et al. | 74/607 |
| 5,145,025 A * | 9/1992 | Damian | 180/381 |
| 6,328,667 B1 * | 12/2001 | Otaki et al. | 74/606 R |
| 7,308,840 B2 * | 12/2007 | Alvarez et al. | 74/574.4 |
| 7,582,037 B2 * | 9/2009 | Engelmann et al. | 475/227 |
| 7,955,212 B2 | 6/2011 | Mochihara | |
| 2007/0173335 A1 | 7/2007 | Engelmann et al. | |

FOREIGN PATENT DOCUMENTS

| | | |
|---|---|---|
| JP | 07141035 A | 6/1995 |
| JP | 07232569 A | 9/1995 |
| JP | 10306844 | 11/1998 |
| JP | 2002168294 A | 6/2002 |

OTHER PUBLICATIONS

Office Action issued Nov. 14, 2012, in corresponding U.S. Appl. No. 13/164,050, filed Jun. 20, 2011.

* cited by examiner

VIBRATION DAMPING DEVICE AND POWER TRANSMISSION DEVICE

INCORPORATION BY REFERENCE

The disclosure of Japanese Patent Application No. 2008-104881 filed on Apr. 14, 2008 including the specification, drawings and abstract is incorporated herein by reference in its entirety.

BACKGROUND OF THE INVENTION

1. Field of the Invention

The invention relates to a vibration damping device and a power transmission device, and more particularly, to a vibration damping device that damps vibrations of a rotary shaft in a translational direction other than a rotational direction thereof using an inertial mass (mass body), and a power transmission device fitted with the vibration damping device.

2. Description of the Related Art

As a vibration damping device that exerts a vibration damping effect in the vicinity of a resonance frequency of a vibration system, a dynamic vibration absorber composed of an inertial mass and an elastic body is often employed. For example, there is known a vibration damping device with an inertial mass and an elastic body whose rigidities are so tuned as to exert a vibration damping effect at the time of bending resonance or torsional resonance of a rotary shaft in a power transmission path of a vehicle.

In such a damper device, however, the rigidity of the elastic body changes due to a change in the temperature of an environment in which the damper device is used, and the rotational speed of the rotary shaft is likely to fluctuate due to a shift of the center of gravity of the inertial mass. In some cases, therefore, it is difficult to obtain a stable vibration damping effect.

Thus, there is a damper weight obtained by, for example, mounting an automatic aligning bearing on a rotary shaft and providing an outer race thereof with a mass (e.g., see Japanese Patent Application Publication No. 10-306844 (JP-A-10-306844)).

However, in the vibration damping device according to the related art as described above, the inertial mass body is rockable on a plane including a rotational center axis of the rotary shaft. Therefore, there is a problem in that bending vibrations of the rotary shaft cannot be effectively damped.

Further, among various noises/vibrations of a rear-wheel-drive vehicle, there is a whining noise on a vehicle interior side resulting from the resonance of a rotation input portion of a rear differential device as a phenomenon with a high degree of difficulty which causes troubles in ensuring the performance. As a measure against this whining noise, it is conceivable to fit the rotation input portion of the rear differential device with a torsional damper so as to suppress a compelling force causing resonance of the rotation input portion. However, the torsional damper is more costly than a mass damper. Besides, in the torsional damper, a resonance frequency exerting a vibration damping effect for torsional resonance is often greatly different from a resonance frequency exerting a vibration damping effect for bending resonance. It is very difficult to achieve both the vibration damping effects for torsional resonance and bending resonance, whose resonance frequencies are greatly different from each other, within a limited installation space, namely, the input portion of the differential device. Thus, in the case where torsional resonance is sufficiently damped at a certain frequency to attempt a reduction in the level of vibrations, the vibration level of bending resonance may worsen at other frequencies.

In addition, the torsional damper achieves a vibration damping effect by adding a new vibration system to existing torsional vibrations and hence changing the compliance characteristic of the torsional vibrations. For structural reasons, however, an inertial mass acts in a rotational direction of the existing torsional vibrations. Therefore, the peak level of the torsional vibrations tend to decrease, and a mesh point dynamic rigidity (compelling force) emerging as an inverse of compliance tends to worsen. Furthermore, around a target frequency, there always emerges a frequency lowering the level of vibrations because of the formation of a trough in the compliance characteristic. The mesh point dynamic rigidity is likely to worsen in that respect as well. As described above, the torsional damper has both an effect of reducing the level of vibrations for a compelling force and an adverse influence accompanied thereby. In some cases, therefore, a sufficient vibration damping effect as expected cannot be exerted even when the characteristic of the damper is adjusted.

SUMMARY OF THE INVENTION

The invention provides a compact and low-cost vibration damping device capable of minimizing an adverse influence on a compliance characteristic of a rotary shaft in a rotational direction thereof and sufficiently exerting a vibration damping effect by an inertial mass for a vibration transmission sensitivity in a translational direction other than the rotational direction, and also provides a low-cost vehicular power transmission device capable of sufficiently reducing the level of vibration noise such as a whining noise or the like.

A first aspect of the invention relates to a vibration damping device equipped with a mass body disposed spaced apart from a rotational center axis of a rotary shaft by a certain distance, and a support portion that rotatably supports the mass body with respect to the rotary shaft and holds a support posture of the mass body with respect to the rotational center axis of the rotary shaft constant.

According to the aforementioned construction, the inertial force of the mass body is minimized in the rotational direction of the rotary shaft, and the influence of the mass body on the compliance characteristic in the rotational direction is sufficiently suppressed, and the inertial force of the mass body in the translational direction other than the rotational direction acts on the rotary shaft. Thus, the influence of the rotary shaft on bending resonance or the like, namely, the effect of damping bending resonance or the like is sufficiently exerted. Besides, the very simple device is composed of the mass body and the support portion that rotatably supports the mass body with respect to the rotational shaft in a certain posture. As a result, this vibration damping device is compact and low in cost.

It should be noted herein that the holding of the support posture of the mass body with respect to the center axis of the rotary shaft constant means that the mass body is supported in an unrockable manner on a virtual plane including the center axis of the rotary shaft.

In the vibration damping device according to this aspect of the invention, the mass body may be annularly formed so as to surround the rotary shaft.

According to the aforementioned construction, the mass body can be rotatably supported with respect to the rotary shaft with a simple construction.

In the vibration damping device according to this aspect of the invention, the support portion may retain the mass body in such a state that the mass body has the same rotational center axis as the rotary shaft.

According to the aforementioned construction, the supporting by a bearing is made possible, and bending resonance can be effectively damped in an arbitrary bending direction.

In the vibration damping device according to this aspect of the invention, the mass body may have a center of gravity on the rotational center axis of the rotary shaft.

According to the aforementioned construction, the mass body is symmetrical with respect to the rotary shaft. Therefore, the mass body is worked and assembled with ease.

In the vibration damping device according to this aspect of the invention, the mass body may have a center of gravity off the rotational center axis of the rotary shaft.

According to the aforementioned construction, the mass body having a sufficient mass can be installed even in a limited installation space by lengthening the mass body in a specific direction. As a result, bending vibrations or the like in the specific direction can be effectively damped.

In the vibration damping device according to this aspect of the invention, the support portion may be constituted by a bearing provided between the rotary shaft and the mass body.

According to the aforementioned construction, the simple and highly resistant support portion is obtained.

In the vibration damping device according to this aspect of the invention, the bearing may be composed of a plurality of rolling members rollably supported on an outer periphery side of the rotary shaft and rollably engaged with the mass body respectively.

According to the aforementioned construction, the supporting rigidity of the bearing in the bending direction of the rotary shaft can be sufficiently ensured, and the adverse influence of the mass body on the compliance characteristic of the rotary shaft in the rotational direction thereof can be reliably suppressed.

In the vibration damping device according to this aspect of the invention, the plurality of the rolling members may be formed respectively in a shape of a circular cylinder having a center rotational axis parallel to the rotational center axis of the rotary shaft.

According to the aforementioned construction, the support portion is low in cost due to the use of roller bearings.

In the vibration damping device according to this aspect of the invention, the support portion may be constructed slidably with respect to the mass body in the rotational direction of the rotary shaft so as to rotatably support the mass body with respect to the rotary shaft.

In the vibration damping device according to this aspect of the invention, the mass body may have such a cross-sectional shape as viewed from a circumferential direction thereof that a width in a direction of the rotational center axis on an outer periphery side is narrower than a width in a direction of the rotational center axis on an inside.

In the vibration damping device according to this aspect of the invention, the mass body and the support portion may be in contact with each other in such a manner as to overlap with each other as viewed from a radial direction of the rotary shaft.

A second aspect of the invention relates to a power transmission device equipped with a vibration damping device equipped with a mass body disposed spaced apart from a center axis of a rotary shaft by a certain distance, and a support portion that rotatably supports the mass body with respect to the rotary shaft and holds a support posture of the mass body with respect to the center axis of the rotary shaft constant, a case, a driving-side gear shaft rotatably supported in the case as the rotary shaft to input a rotational power, a driven-side gear shaft accommodated in the case to mesh with the driving-side gear shaft and rotate in a decelerative manner, and an output shaft that is rotationally driven by the driven-side gear shaft.

According to the aforementioned construction, while the peak of vibrations occurring to the case in the vicinity of an end of an input shaft of the driving-side gear shaft due to a compelling force at a mesh point of the driving-side gear shaft and the driven-side gear shaft is determined by the resonance frequency of the driving-side gear shaft, the mass of the mass body is so set as to exert a mass effect in the vicinity of the resonance frequency as to vibrations in a translational direction other than the rotational direction of the driving-side gear shaft. Thus, the vibration peak of the power transmission device, which is determined by the vibration transmission sensitivity of the case in the vicinity of the end of the input shaft of the driving-side gear shaft, can be effectively reduced.

In the power transmission device according to this aspect of the invention, the vibration damping device may be disposed on the driving-side gear shaft such that a distance to that one of both ends of the driving-side gear shaft which is relatively far from a mesh position of the driving-side gear shaft and the driven-side gear shaft is shorter than a distance to that one of the ends which is relatively close to the mesh position.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Preferred embodiments of the invention will be described hereinafter with reference to the drawings.

Figure 1:
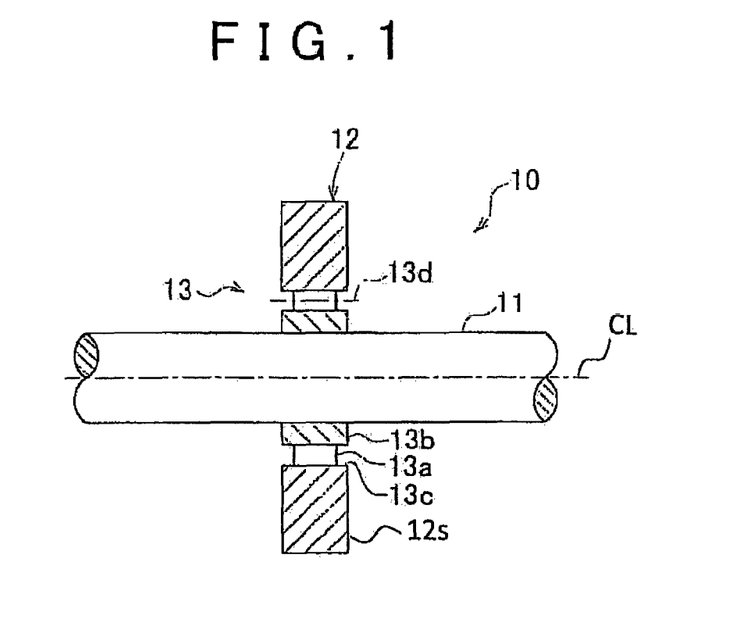
FIG. 1 is a schematic lateral sectional view of a vibration damping device according to the first embodiment of the invention.
Figure 2:
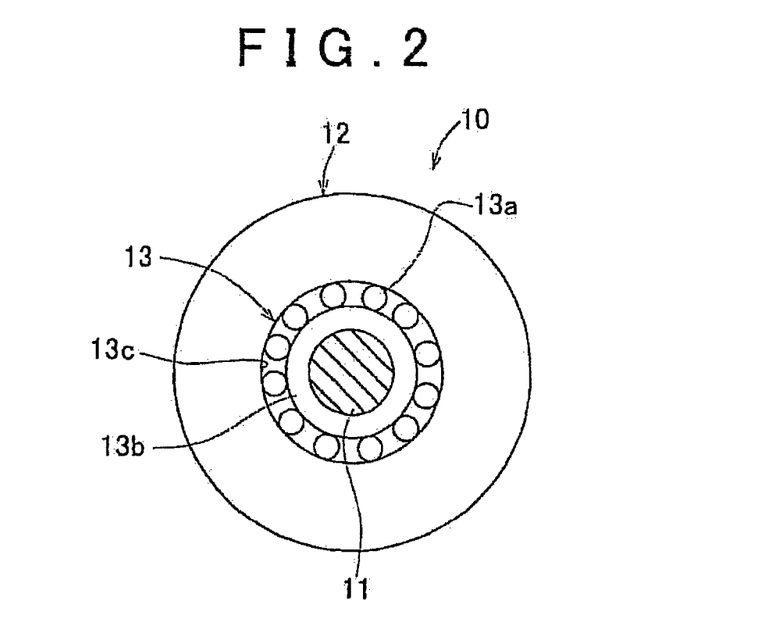
FIG. 2 is a schematic front sectional view of the vibration damping device according to the first embodiment of the invention.
Figure 3:
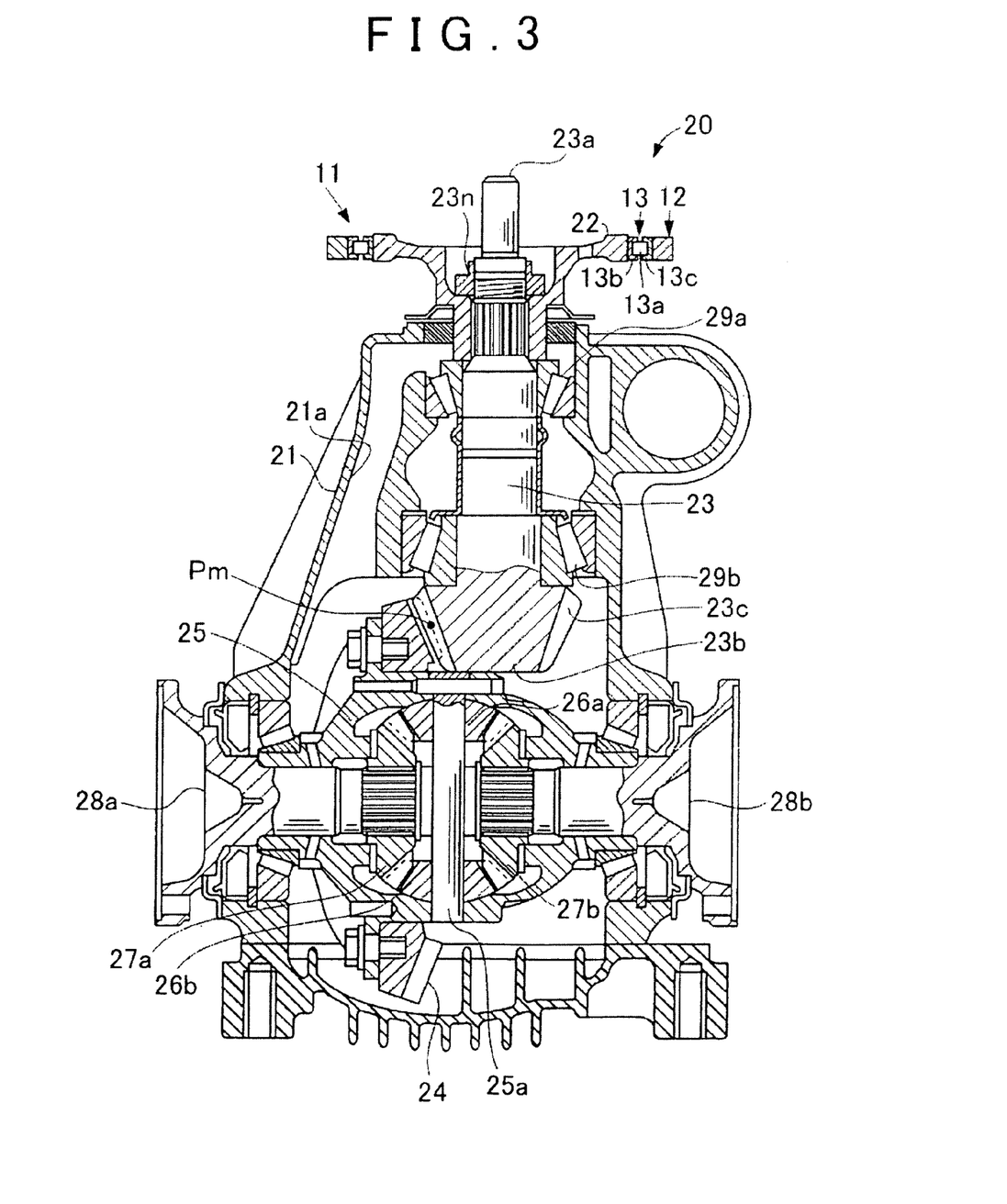
FIG. 3 is a lateral sectional view of a power transmission device fitted with the vibration damping device according to the first embodiment of the invention.

FIG. 1 is a schematic lateral sectional view of a vibration damping device according to the first embodiment of the invention. FIG. 2 is a schematic front sectional view of the vibration damping device. FIG. 3 is a lateral sectional view of a power transmission device fitted with the vibration damping device according to the first embodiment of the invention. The vibration damping device according to this embodiment of the invention is applied to a mass damper for damping bending resonance which is fitted to a rear differential device of a rear-wheel-drive vehicle.

First of all, the construction of the vibration damping device will be described.

As shown in FIGS. 1 and 2, a vibration damping device 10 is equipped with a mass body 12 disposed spaced apart from a rotational center axis CL of a rotary shaft 11 by a certain distance, and a rolling bearing 13 as a support portion that rotatably supports this mass body 12 with respect to the rotary shaft 11 and holds a support posture of the mass body 12 with respect to the rotational center axis CL of the rotary shaft 11 constant.

The rotary shaft 11 is rotatably supported in a rear differential device 20 shown in FIG. 3 (which will be described later).

As shown in FIGS. 1 and 2, the mass body 12 is annularly formed, for example, so as to surround the rotary shaft 11, and is so retained by the rolling bearing 13 as to always have the same center axis as the rotary shaft 11. Further, the mass body 12 has a center of gravity on the rotational center axis CL of the rotary shaft 11.

The rolling bearing 13 is constituted by a roller bearing provided between the rotary shaft 11 and the mass body 12. This rolling bearing 13 is composed of, for example, a plurality of rollers 13a (rolling members) rollably supported on an outer periphery side of the rotary shaft 11 and rollably engaged with the mass body 12 respectively, an inner race 13b integrally fitted on the rotary shaft 11, and an outer race 13c integrally provided on an inner periphery side of the annular mass body 12.

It should be noted herein that the plurality of the rollers 13a are formed respectively in the shape of a circular cylinder having a center axis 13d parallel to the rotational center axis CL of the rotary shaft 11, and are retained on an outer peripheral face of the rotary shaft 11 equidistantly in a circumferential direction thereof by a retainer (not shown).

Although a lubricating film made of grease or the like can be formed between the plurality of the rollers 13a of the rolling bearing 13 and the inner race 13b, and between the plurality of the rollers 13a and the outer race 13c integrated with the inner periphery side of the annular mass body 12, there is substantially no clearance (backlash) therebetween.

Thus, the mass body 12 is substantially integral with the rotary shaft 11 in a radial direction thereof. When bending vibrations occur to the rotary shaft 11, a vibration exciting force in the radial direction and an inertial force counterbalancing the vibration exciting force directly act on each other between the rotary shaft 11 and the mass body 12.

Further, the mass body 12, which is rotatably supported with respect to the rotary shaft 11 via the plurality of the rollers 13a, is retained in its upright posture (its support posture with respect to the rotary shaft 11) by the rolling bearing 13 such that a lateral face 12s (see FIG. 1) of the mass body 12 extends perpendicularly to the rotational center axis CL of the rotary shaft 11. That is, the mass body 12 is rotatably supported with respect to the rotary shaft 11 by the rolling bearing 13 in such a state as to be substantially unrockable on a virtual plane including the rotational center axis CL of the rotary shaft 11, and is in contact with the rolling bearing 13 in an overlapping manner as viewed in the radial direction of the rotary shaft 11.

On the other hand, the vibration damping device 10 is mounted on an outer periphery of a companion flange 22 fitted to, for example, a tip side of the rear differential device 20.

The companion flange 22 is fastened by bolts concentrically to a flexible joint or a companion flange on a propeller shaft (not shown) side. That is, the companion flange 22 rotates when a rotational power from the propeller shaft is input thereto.

The rear differential device 20 has a differential carrier case 21 (case), a drive pinion 23 (driving-side gear shaft) having an outer end 23a (input shaft end) protruding from a tip of the differential carrier case 21 to a vehicle front side and an inner end 23b to which a bevel gear 23c is fitted, a ring gear 24 (driven-side gear shaft) as a large-diameter bevel gear meshed with the bevel gear 23c of the drive pinion 23, a tubular differential housing 25 integrally coupled to the ring gear 24 and having an axis extending in a vehicle lateral direction, pinions 26a and 26b rotatably supported by a shaft 25a fitted to a central portion of the differential housing 25, left and right side gears 27a and 27b meshed with these pinions 26a and 26b, and left and right axle shafts 28a and 28b rotationally integrally coupled to these side gears 27a and 27b respectively. The drive pinion 23 is rotatably supported by the differential carrier case 21 via two pairs of conical bearings 29a and 29b. A rotational power from the propeller shaft (not shown) is input to the drive pinion 23.

In this rear differential device 20, the rotary shaft 11 is composed of the companion flange 22 and the drive pinion 23.

More specifically, the companion flange 22 coupled to the propeller shaft side is rotationally integrally fitted to the outer end 23a of the drive pinion 23 through spline coupling or the like, and is integrally fastened/fixed to the outer end 23a of the pinion 23 by a fastening member 23n such as a nut or the like.

Further, the inner end of the companion flange 22 abuts on an inner race region of the front-side conical bearing 29a, and the drive pinion 23 is attracted forward with a constant force by being fastened by the fastening member 23n at a set torque. Thus, the drive pinion 23 is integrated with the inner races of the conical bearings 29a and 29b, and is rotatably supported in a required posture at a position set for the differential carrier case 21.

The ring gear 24 and the differential housing 25 are accommodated in the differential carrier case 21, and constitute the driven-side gear shaft that is meshed with the drive pinion 23 to rotate in a decelerative manner. Through decelerative rotation of the ring gear 24, the differential housing 25 is caused to rotate, and the pinions 26a and 26b and the side gears 27a and 27b are caused to rotate together with the shaft 25a. Thus, a rotational driving force is transmitted to the left and right axle shafts 28a and 28b (output shafts). Further, since the pair of the pinions 26a and 26b are rotatable with respect to the shaft 25a, the side gears 27a and 27b are rotatable relative to each other and enable differential during a turn of the vehicle. The conical bearings 29a and 29b are disposed spaced apart from each other so as to face each other on a small-diameter side, and are lubricated by lubricating oil supplied through an oil passage 21a formed in the differential carrier case 21.

The mass body 12, which is rotatable with respect to the rotary shaft 11, does not substantially apply an inertial force to the rotary shaft 11 in the rotational direction thereof, and applies an inertial force to the rotary shaft 11 only in a translational direction thereof other than the rotational direction (a radial direction or an axial direction of the rotary shaft 11). The mass of the mass body 12 is so set as to exert a sufficient mass effect for vibrations in a bending direction of the rotary shaft 11 especially around a peak of a mesh point dynamic rigidity (which will be described later) that affects vibrations (vibration transmission sensitivity) of a rotation input portion of the rotary shaft 11. Then, due to the mass effect of the mass body 12, a compelling force (mesh point dynamic rigidity) generating a so-called differential whining noise is suppressed, and the transmission sensitivity from a mesh point Pm (see FIG. 3) to an evaluation point set at a tip of the differential carrier case 21 is reduced. As a result, the vibration level at the evaluation point is reduced in a broad band.

Next, the operation of the vibration damping device will be described.

In this embodiment of the invention constructed as described above, when a rotational power, which has been output from a prime mover mounted on the vehicle and changed in speed by a transmission, is input to the outer end 23a of the drive pinion 23 via the propeller shaft, a differential housing 25 rotates through decelerative rotation of the ring gear 24 meshed with the drive pinion 23. The pinions 26a and 26b and the side gears 27a and 27b rotate together with the shaft 25a inside the differential housing 25, and a rotational driving force is transmitted to the left and right axle shafts 28a and 28b (output shafts). Further, when a difference in rotational angle (angular speed) occurs between the left and right axle shafts 28a and 28b during a turn of the vehicle, the side gears 27a and 27b, which are coupled to each other in a manner enabling differential via the pair of the pinions 26a and 26b, rotate relative to each other.

In this running drive state of the vehicle, the drive pinion 23 receives a reactive force from the mesh point with the ring gear 24 while receiving the rotational power input to the outer end 23a of the drive pinion 23. The reactive force fluctuates as the drive pinion 23 and the ring gear 24 rotate, and moreover, as the input rotational power and reactive torques from the axle shafts 28a and 28b sides change. Further, vibrations in the bending direction are also input to the drive pinion 23 in accordance with a running state of the vehicle and through bending vibrations on the propeller shaft side, or in accordance with changes in suspension geometry or the like. As a result, such bending vibrations causing the companion flange 22 fitted to the outer end 23a to oscillate are generated as well. Accordingly, in the rear differential device 20, vibrations are likely to occur on the tip side as the rotation input portion fitted with the drive pinion 23. Resonance at the tip is transmitted to a vehicle body side and may generate a so-called differential whining noise.

One of the compelling forces causing resonance of the rotational input portion of the rear differential device 20 leads to periodical responsive displacement that occurs to the differential carrier case 21 in the vicinity of the outer end 23a of the drive pinion 23 through the excitement of vibrations at the mesh point of the drive pinion 23 and the ring gear 24. The compelling force can be grasped from a mesh point dynamic rigidity indicating an amplitude ratio of periodical responsive displacement occurring to the rotational input portion of the rear differential device 20 for a vibration excitement amplitude at the mesh point Pm of the drive pinion 23 and the ring gear 24.

In order to suppress this compelling force, it is effective to fit a torsional damper, whose resonance frequency of torsional resonance is set to a value in the vicinity of the torsional resonance frequency of the drive pinion 23, on the companion flange 22 or in the vicinity thereof. That is, while the peak of the compelling force causing periodical responsive displacement occurring to the differential carrier case 21 in the vicinity of the outer end 23a of the drive pinion 23 through the excitement of vibrations from the mesh point of the drive pinion 23 and the ring gear 24 is determined by the resonance frequency of a drive line including the drive pinion 23, the resonance frequency of the torsional damper for damping the vibrations of torsional resonance at the resonance frequency is set to a value in the vicinity of the torsional resonance frequency of the drive line including the drive pinion 23. Thus, the peak of the compelling force can be held low.

Figure 5A:
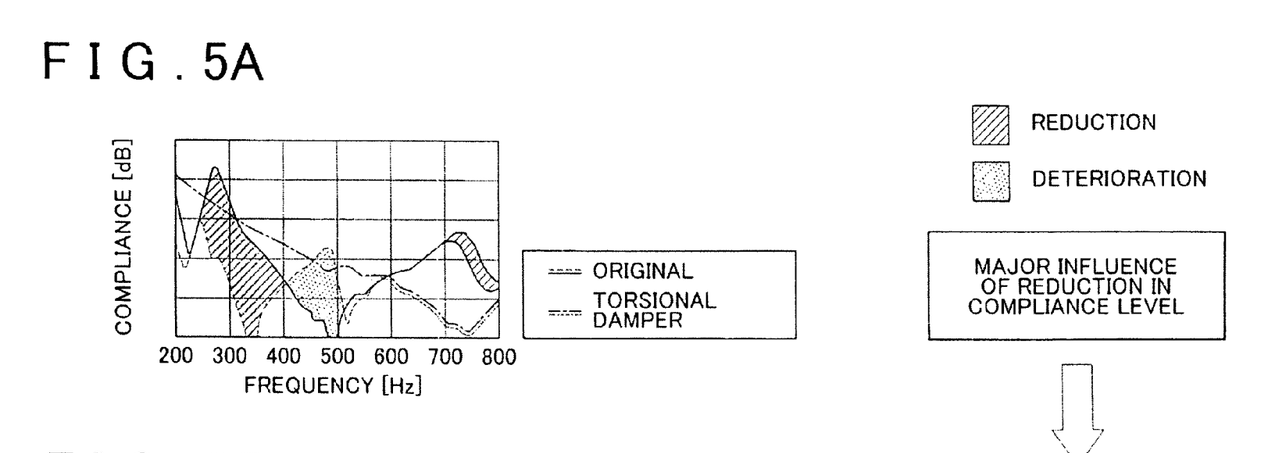
FIGS. 5A to 5D are characteristic diagrams showing vibration characteristics of a power transmission device according to a comparative example, which employs a torsional damper, in the vicinity of an end thereof on a rotational power input side.
Figure 5B:
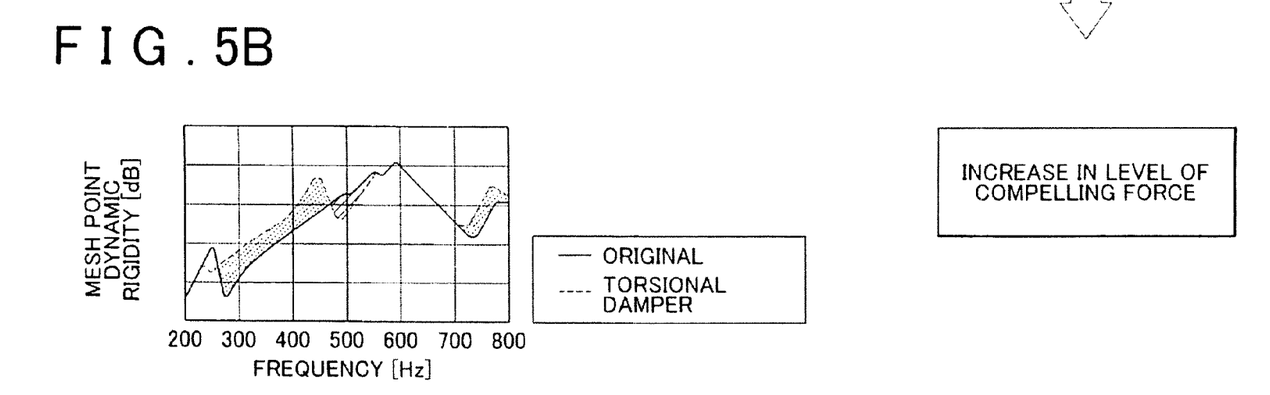
Figure 5C:
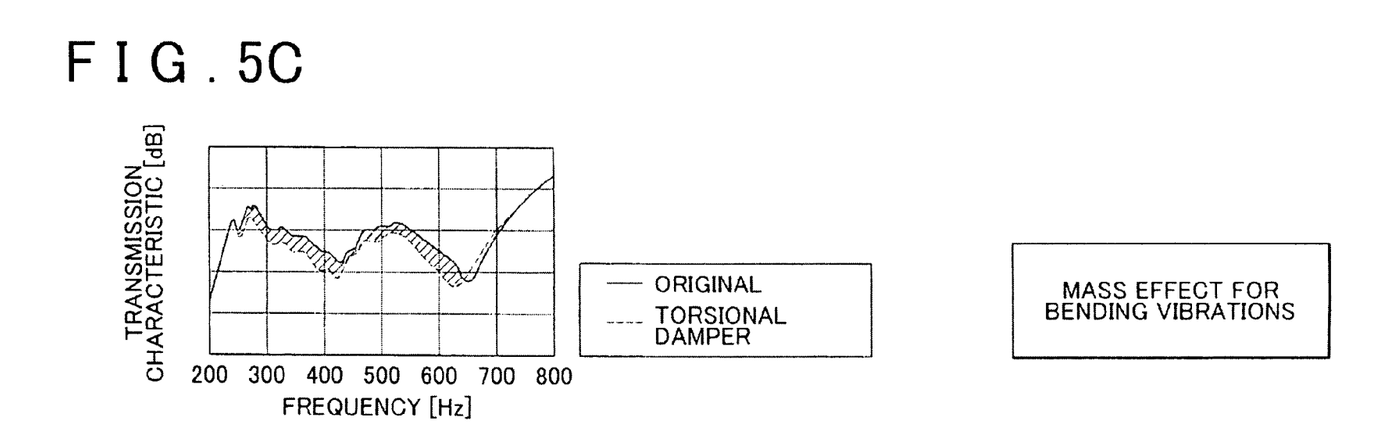
Figure 5D:
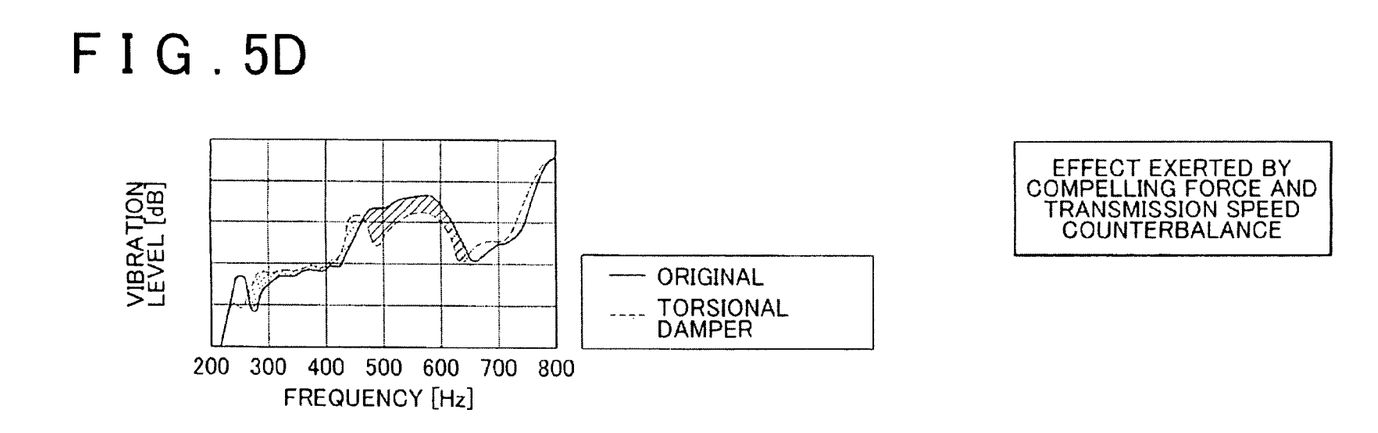

However, when a compelling force causing a differential whining noise is reduced as indicated by a hatched region in FIG. 5B by the torsional damper, the compliance is reduced as shown in FIG. 5A around a frequency range of the differential whining noise. Therefore, as shown in FIG. 5B, the level of the compelling force worsens/rises. While the mass effect for bending vibrations as shown in FIG. 5C can be exerted by setting an inertial weight, the vibration level at the tip of the rear differential device 20 has its mass effect counterbalanced by a degree corresponding to the worsening of the compelling force as shown in FIG. 5D. Therefore, when there is a great influence of bending resonance on the differential whining noise, it is difficult to effectively damp the differential whining noise even by using the costly torsional damper.

Further, a mere fixed mass (a mass body fixed to the rotary shaft) is low in cost, but has a great rotational inertia, and thus inevitably has an adverse influence on the compliance and the mesh point dynamic rigidity.

Figure 4A:
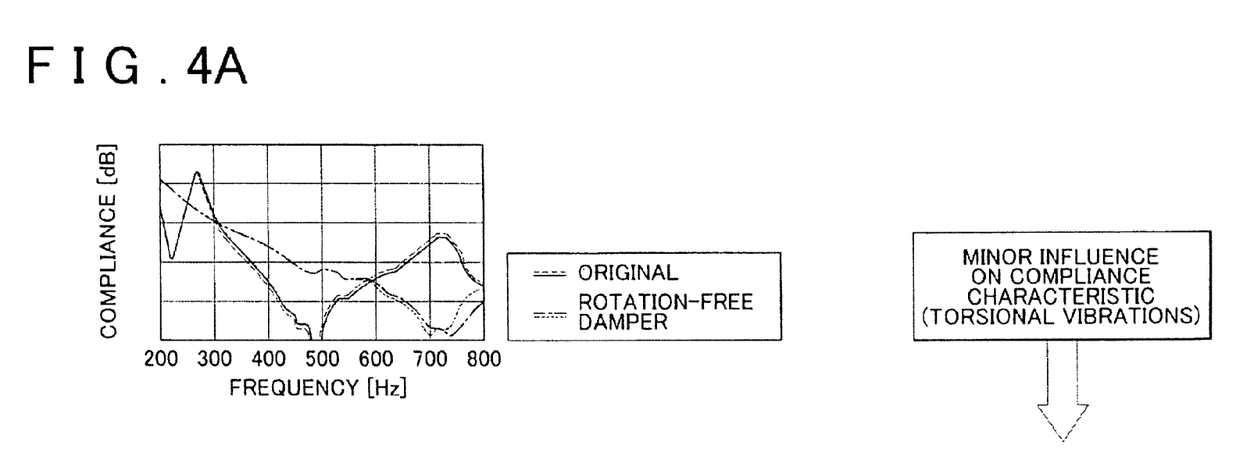
FIGS. 4A to 4D are characteristic diagrams showing vibration characteristics of the power transmission device fitted with the vibration damping device according to the first embodiment of the invention in the vicinity of an end thereof on a rotational power input side.
Figure 4B:
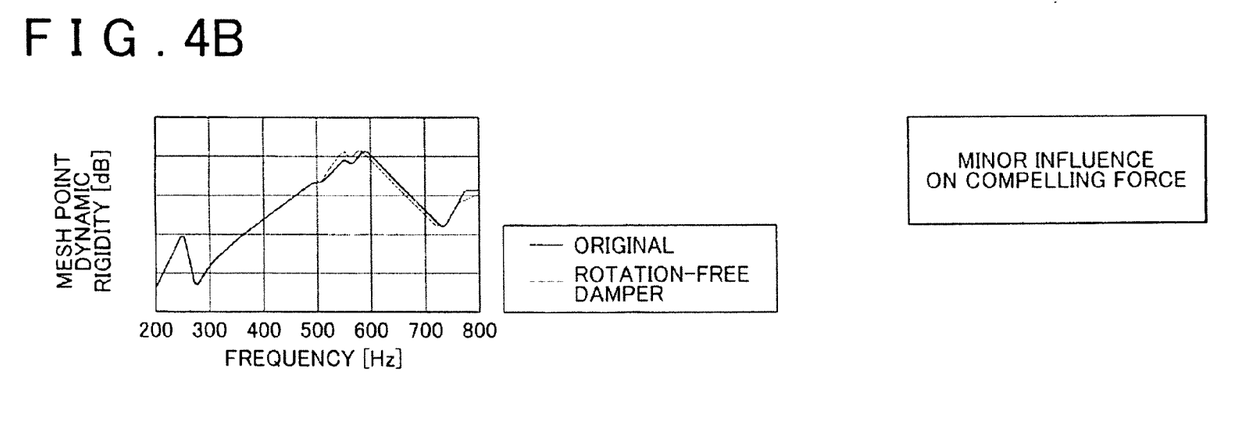
Figure 4C:
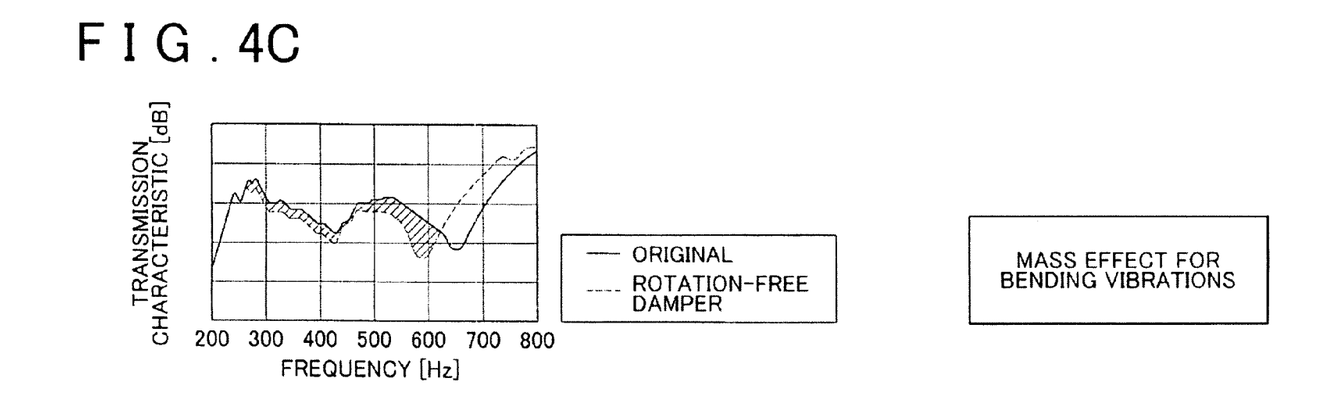
Figure 4D:
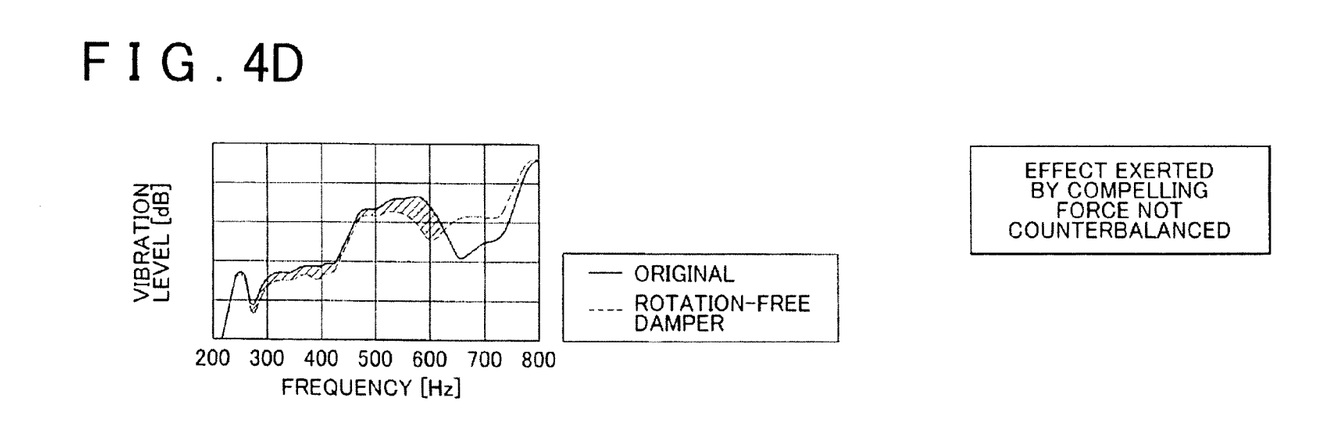

Meanwhile, in this embodiment of the invention, the mass body 12 is rotatable with respect to the rotary shaft 11. Therefore, as shown in FIGS. 4A and 4B, there is substantially no influence on the compliance or the mesh point dynamic rigidity (compelling force). On the other hand, however, as shown in FIG. 4C, the mass body 12 exerts a mass effect for bending vibrations of the rotary shaft 11 not only around the peak of the compelling force but also in a broad band. Accordingly, the mass effect is not counterbalanced due to the worsening of the compelling force as in the case where the torsional damper is used, and bending resonance of the rotation input portion of the rear differential device 20 can be effectively suppressed. When there is a great influence of bending resonance on a differential whining noise, the differential whining noise can be effectively suppressed. Further, there is no need to use an elastic body as in the case of the torsional damper. As a result, low cost and compactness can be realized.

As described above, in the vibration damping device 10 according to this embodiment of the invention, the adverse influence on the compliance characteristic of the rotary shaft 11 in the rotational direction thereof, which causes gear noise or gear whining, is sufficiently suppressed, and an inertial force acts in the translational direction other than the rotational direction. Thus, the influence of the mass body 12 on bending resonance of the rotary shaft 11 or the like, namely, the effect of damping bending resonance or the like is sufficiently exerted. Besides, the device is simply composed of the mass body 12 and the rolling bearing 13 that rotatably supports the mass body 12 with respect to the rotary shaft 11 in a constant posture. As a result, the vibration damping device is compact and low in cost.

Further, in this embodiment of the invention, the mass body 12 is annularly formed so as to surround the rotary shaft 11. Therefore, the mass body 12 can be rotatably supported on the rotary shaft 11 with a simple construction. The rolling bearing 13 retains the mass body 12 coaxially with the rotary shaft 11. Therefore, it is possible not only to realize the supporting by the rolling bearing 13 but also to effectively damp bending resonance for an arbitrary bending direction.

In addition, the mass body 12 has a center of gravity on the rotational center axis CL of the rotary shaft 11. Therefore, the mass body 12 is symmetrical with respect to the rotary shaft 11. As a result, the mass body 12 is worked and assembled with ease as well.

Further, support means for rotatably supporting the mass body 12 on the rotary shaft 11 is constituted by the bearing provided between the rotary shaft 11 and the mass body 12. Therefore, the support means is simple and highly resistant.

In addition, the rolling bearing 13 is composed of the plurality of the rollers 13a rollably supported on the outer periphery side of the rotary shaft 11 and rollably engaged with the mass body 12 respectively. Therefore, the support rigidity of the rolling bearing 13 in the bending direction of the rotary shaft 11 is ensured, and the adverse influence of the mass body 12 on the compliance characteristic in the rotational direction of the rotary shaft 11 can be reliably suppressed.

Further, the plurality of the rollers 13a are formed respectively in the shape of a circular cylinder having a center axis parallel to the rotational center axis CL of the rotary shaft 11. Therefore, the support means can be constituted at low cost, using the roller bearing.

On the other hand, the rear differential device 20 according to this embodiment of the invention is equipped with the vibration damping device 10, the differential carrier case 21, the drive pinion 23 rotatably supported by the differential carrier case 21 to input a rotational power, the ring gear 24 accommodated in the differential carrier case 21 and meshed with the drive pinion 23 to rotate in a decelerative manner, and the axle shafts 28a and 28b rotationally driven by the ring gear 24. Therefore, while the peak of vibrations occurring to the differential carrier case 21 in the vicinity of the end of the input shaft of the drive pinion 23 due to the compelling force at the mesh point of the drive pinion 23 and the ring gear 24 is determined by the resonance frequency of the drive pinion 23, the mass of the mass body 12 is so set as to exert a mass effect in the vicinity of the bending resonance frequency of the drive pinion 23. Thus, the peak of vibrations of the tip of the rear differential device 20, which is determined by the vibration transmission sensitivity in the vicinity of the end of the input shaft of the drive pinion 23, can be suppressed to effectively reduce the differential whining noise.

As described above, in this embodiment of the invention, the inertial force applied by the mass body 12 in the rotational (torsional) direction of the rotary shaft 11 is caused to act in the translational direction other than the rotational direction while being minimized, and the device is composed of the mass body 12 and the rolling bearing 13 as very simple support means for rotatably supporting the mass body 12 with respect to the rotary shaft 11. Therefore, the compact and low-cost vibration damping device that can sufficiently exert the effect of suppressing bending vibrations or the like without having such an adverse influence as causes gear noise or gear whining on the compliance characteristic of the rotary shaft 11 in the rotational direction thereof can be provided.

Furthermore, the mass of the mass body 12 is so set as to exert a mass effect in the vicinity of the bending resonance frequency of the drive pinion 23. Thus, the peak of vibrations at the tip of the rear differential device 20, which is determined by the vibration transmission sensitivity of the case in the vicinity of the end of the input shaft of the drive pinion 23, can be reduced. As a result, the device can be made low in cost with the capacity to sufficiently reduce a vibration noise such as a whining noise or the like.

Figure 6A:
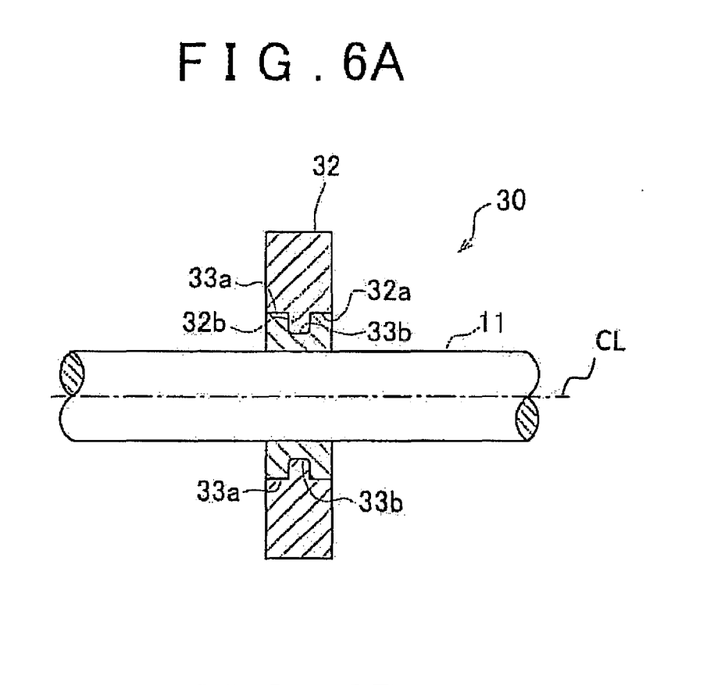
FIG. 6A is a schematic lateral sectional view of a vibration damping device according to the second embodiment of the invention.
Figure 6B:
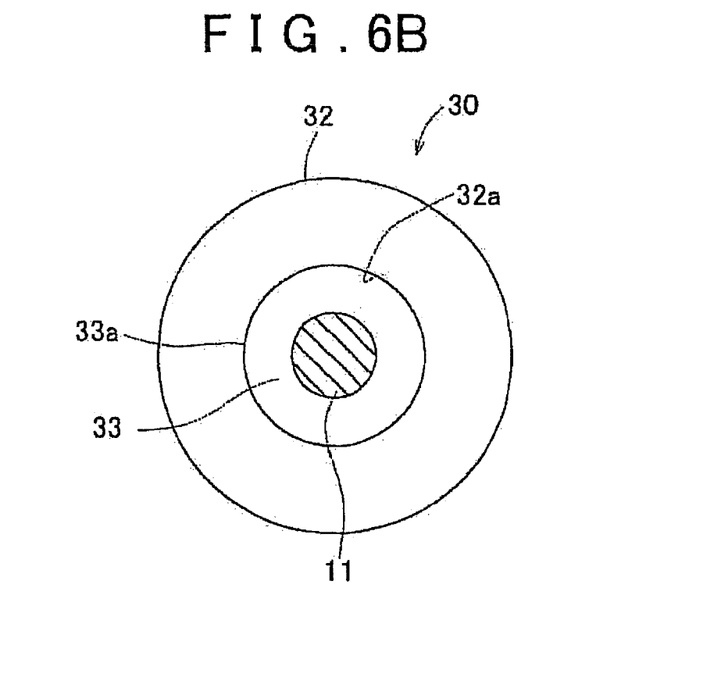
FIG. 6B is a schematic front sectional view of the vibration damping device according to the second embodiment of the invention.

FIG. 6A is a schematic lateral sectional view of a vibration damping device according to the second embodiment of the invention, and FIG. 6B is a schematic front sectional view of the vibration damping device according to the second embodiment of the invention.

The respective embodiments of the invention, which will be described later, have substantially the same overall construction as the foregoing first embodiment of the invention, and are different only in part of the construction from the foregoing embodiment of the invention. Therefore, components identical to those of the foregoing first embodiment of the invention will be described in detail only as to what is different from those of the foregoing first embodiment of the invention, using the same symbols as those of the corresponding components shown in FIGS. 1 to 3.

As shown in FIGS. 6A and 6B, the vibration damping device 30 according to this embodiment of the invention is equipped with the mass body 32 disposed spaced apart from the rotational center axis CL of the rotary shaft 11 by a certain distance, and a slide bearing 33 as support means for rotatably supporting this mass body 32 on the rotary shaft 11 and holding the support posture of the mass body 32 with respect to the rotational center axis CL of the rotary shaft 11 constant.

The mass body 32 is annularly formed so as, for example, to surround the rotary shaft 11. The mass body 32 has an annular convex portion 32b with a rectangular cross-section which radially inward and perpendicularly protrudes from a cylindrical inner peripheral face 32a thereof. Both lateral faces of the convex portion 32b are perpendicular to the inner peripheral face 32a and the rotational center axis CL of the rotary shaft 11. Further, the mass body 12 has a center of gravity on the rotational center axis CL of the rotary shaft 11.

The slide bearing 33 assumes a convexo-concave shape corresponding to the shape on the inner periphery side of the mass body 32, and has an annular concave portion 33b with a rectangular cross-section which is radially inward and perpendicularly depressed from a cylindrical outer peripheral face 33a thereof. Then, both the lateral faces of the concave portion 33b are perpendicular to the outer peripheral face 33a and the rotational center axis CL of the rotary shaft 11. The slide bearing 33 may be designed such that the concave portion 33b is formed by two parts butted against each other in the axial direction.

The mass body 32 and the slide bearing 33 are rotatable relative to each other, through the relative sliding around the rotational center axis CL of the rotary shaft 11.

The clearance between the slide bearing 33 and the inner periphery of the mass body 32 is a minimum clearance that enables sliding while forming a lubricating film made of grease or the like. The mass body 32 is substantially integrated with the rotary shaft 11 in the radial direction. Further, the slide bearing 33 and the mass body 32 are in contact with each other so as to overlap with each other as viewed from the radial direction of the rotary shaft 11. Thus, when bending vibrations occur to the rotary shaft 11, a vibration exciting force in the radial direction and an inertial force counterbalancing the vibration exciting force directly act on each other between the rotary shaft 11 and the mass body 32.

Further, the upright posture (the support posture with respect to the rotary shaft 11) of the mass body 32 is always held constant by the slide bearing 33 such that a lateral face 32s of the mass body 32 and both the lateral faces of the convex portion 32b extend perpendicularly to the rotational center axis CL of the rotary shaft 11. That is, the mass body 32 is supported in an unrockable manner on the plane including the rotational center axis CL of the rotary shaft 11.

This vibration damping device 30 is mounted on the outer periphery of the companion flange 22 fitted on, for example, the tip side of the rear differential device 20.

In the vibration damping device 30 according to this embodiment of the invention constructed as described above as well, while the magnitude of the inertial force in the rotational (torsional) direction of the rotary shaft 11 is minimized by the mass body 32, the inertial force is caused to act in the translational direction other than the rotational direction. Thus, the effect of damping bending resonance of the rotary shaft 11 by the mass body 32 is sufficiently exerted. Also, the device is composed of the mass body 32 and the slide bearing 33 as the very simple support means for rotatably supporting the mass body 32 with respect to the rotary shaft 11 in a certain posture. Therefore, the compact and low-cost vibration damping device capable of sufficiently exerting the effect of damping bending resonance or the like without having such an adverse influence as causes gear noise or gear whining on the compliance characteristic of the rotary shaft 11 in the rotational direction thereof can be provided.

Figure 7A:
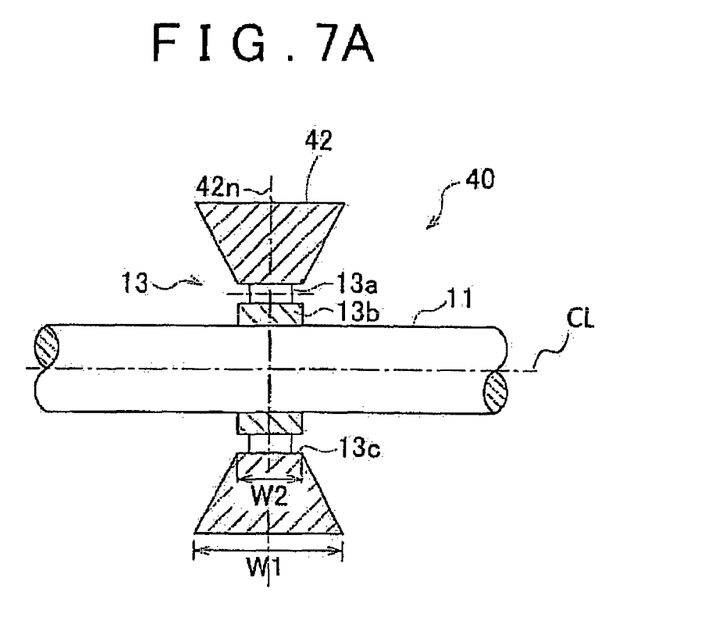
FIG. 7A is a schematic lateral sectional view of a vibration damping device according to the third embodiment of the invention.
Figure 7B:
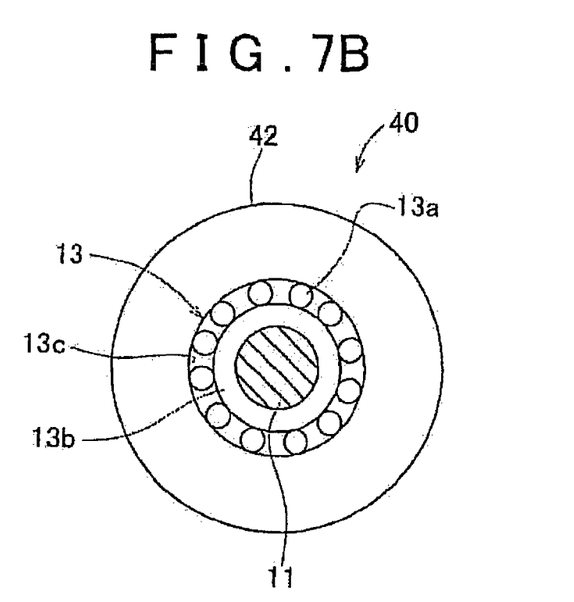
FIG. 7B is a schematic front sectional view of the vibration damping device according to the third embodiment of the invention.

FIG. 7A is a schematic lateral sectional view of a vibration damping device according to the third embodiment of the invention, and FIG. 7B is a schematic front sectional view of the vibration damping device according to the third embodiment of the invention. This embodiment of the invention has substantially the same overall construction as the foregoing first embodiment of the invention, and is different only in the cross-sectional shape of a mass body from the foregoing first embodiment of the invention.

As shown in FIGS. 7A and 7B, a vibration damping device 40 according to this embodiment of the invention is equipped with a mass body 42 disposed spaced apart from the rotational center axis CL of the rotary shaft 11 by a certain distance, and the rolling bearing 13 as the support means for rotatably supporting this mass body 42 with respect to the rotary shaft 11 and holding the support posture of the mass body 42 with respect to the rotational center axis CL of the rotary shaft 11 constant.

As shown in FIG. 7A, the mass body 42 has a trapezoidal cross-section having a wide axial width W1 on an outer periphery side and a narrow axial width W2 on an inner periphery side, and is annularly formed so as to surround the rotary shaft 11. Further, the vibration damping device 40 is integrally provided, on the inner periphery side thereof, with an outer race 13c of the rolling bearing 13.

Although the outer diameter of the mass body 42 is equal to, for example, the outer diameter of the mass body 12 in the foregoing first embodiment of the invention, the mass of the mass body 42 is larger than the mass of the mass body 12 in the first embodiment of the invention. Further, the centroid (partial center of gravity) of the trapezoidal cross-section of the mass body 42 is located radially outward of an intermediate point between an inner peripheral face of the mass body 42 and an outer peripheral face thereof. An intermediate plane 42n of the mass body 42, which includes the centroid thereof, is perpendicular to the rotational center axis CL of the rotary shaft 11.

In the vibration damping device 40 according to this embodiment of the invention constructed as described above as well, while the magnitude of the inertial force in the rotational direction of the rotary shaft 11 is minimized by the mass body 42, the inertial force is caused to act in the translational direction other than the rotational direction. Also, the device is composed of the mass body 42 and the rolling bearing 13 as the very simple support means for rotatably supporting the mass body 42 with respect to the rotary shaft 11 in a certain posture. Therefore, as is the case with the foregoing first embodiment of the invention, the compact and low-cost vibration damping device capable of sufficiently exerting the effect of damping bending resonance or the like without having such an adverse influence as causes gear noise or gear whining on the compliance characteristic of the rotary shaft 11 in the rotational direction thereof can be provided.

Figure 8A:
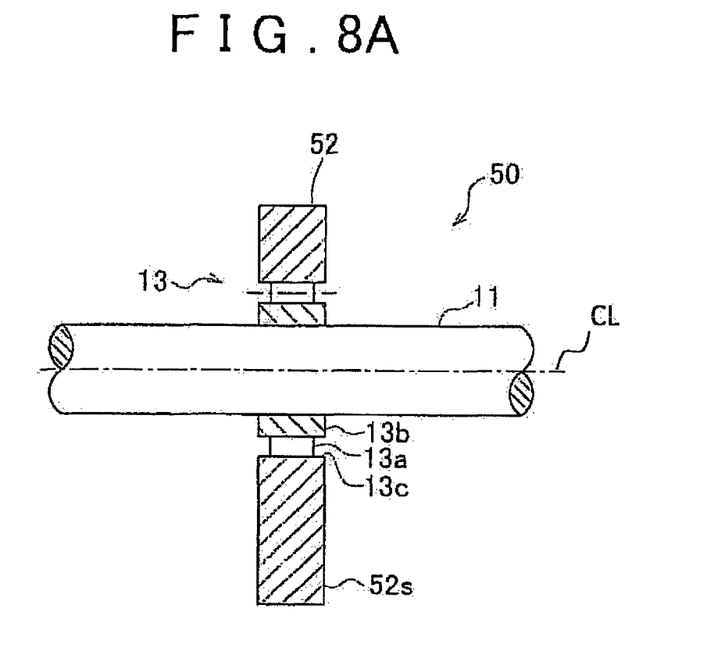
FIG. 8A is a schematic lateral sectional view of a vibration damping device according to the fourth embodiment of the invention.
Figure 8B:
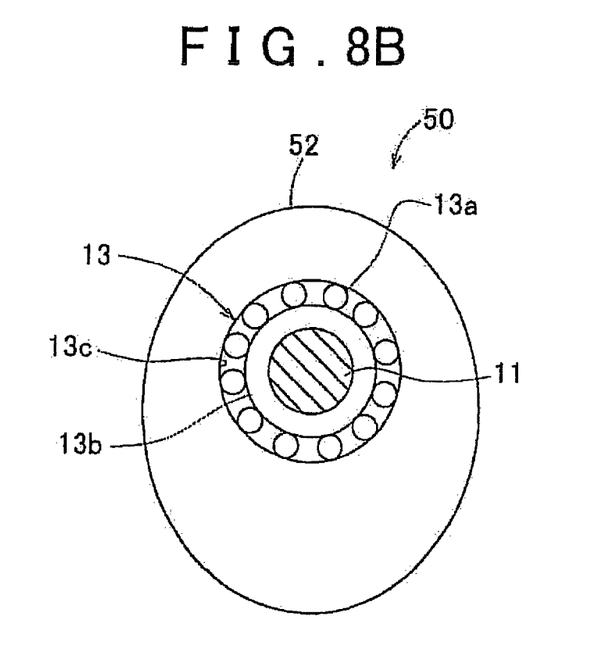
FIG. 8B is a schematic front sectional view of the vibration damping device according to the fourth embodiment of the invention.

FIG. 8A is a schematic lateral sectional view of a vibration damping device according to the fourth embodiment of the invention, and FIG. 8B is a schematic front sectional view of the vibration damping device according to the fourth embodiment of the invention. This embodiment of the invention has substantially the same overall construction as the foregoing first embodiment of the invention, and is different only in the shape of a mass body from the foregoing first embodiment of the invention.

As shown in FIGS. 8A and 8B, a vibration damping device 50 according to this embodiment of the invention is equipped with a mass body 52 disposed spaced apart from the rotational center axis CL of the rotary shaft 11 by a certain distance, and the rolling bearing 13 as the support means for rotatably supporting this mass body 52 with respect to the rotary shaft 11 and holding the support posture of the mass body 52 with respect to the rotational center axis CL of the rotary shaft 11 constant.

As shown in FIG. 8B, the mass body 52 assumes a generally elliptical outer peripheral shape, and is eccentrically fitted to the rotary shaft 11. That is, the mass body 52 has a center of gravity off the rotational center axis CL of the rotary shaft 11. By being rotatably supported with respect to the rotary shaft 11 via the rolling bearing 13, the mass body 52 is in a posture with its major axis extending vertically, and the center of gravity of the mass body 52 is located below the rotational center axis CL of the rotary shaft 11.

Further, the mass body 52 is supported on the rotary shaft 11 via the rolling bearing 13. The mass body 52 is thereby held in its upright posture such that a lateral face 52s of the mass body 52 extends perpendicularly to the rotational center axis CL of the rotary shaft 11.

In the vibration damping device 50 according to this embodiment of the invention constructed as described above as well, while the magnitude of the inertial force in the rotational direction of the rotary shaft 11 is minimized by the mass body 52, the inertial force is caused to act in the translational direction other than the rotational direction. Also, the device is composed of the mass body 52 and the rolling bearing 13 as the very simple support means for rotatably supporting the mass body 52 with respect to the rotary shaft 11 in a certain posture. Therefore, as is the case with the foregoing embodiments of the invention, the compact and low-cost vibration damping device capable of sufficiently exerting the effect of damping bending resonance or the like without having such an adverse influence as causes gear noise or gear whining on the compliance characteristic of the rotary shaft 11 in the rotational direction thereof can be provided.

Furthermore, in this embodiment of the invention, by lengthening the mass body 52 in a specific direction, the mass body 52 having a sufficient mass can be installed in a limited installation space, and bending resonance or the like in the specific direction can be effectively damped. Further, it is also conceivable to utilize the mass body 52 as a pendulum-like inertial mass as well for bending vibrations in other directions.

In each of the foregoing embodiments of the invention, using the rolling bearing 13 or the slide bearing 33, the mass body 12, 22, 42 or 52 is rotatably retained by the rotary shaft 11 in a certain support posture. However, such a bearing is not absolutely required. For example, it is also conceivable to form a closed annular chamber in an outer periphery portion of the companion flange 22, and encapsulate a fluid with low viscous friction resistance and high specific gravity in the chamber to cause an inertial force to act substantially not in the rotational direction but only in the translational direction other than the rotational direction. Further, in the case where a bearing is employed as the support means, a roller bearing may be employed from the standpoint of ensuring sufficient support rigidity of the support means. However, in the case where the mass body is encapsulated in a rotational body integrated with the rotary shaft and rotatably supported via a fluid bearing or a magnetic bearing, a similar effect can be expected even when a bearing other than the roller bearing is employed. Needless to say, the rolling bearing is not limited to a roller bearing but may be a plurality of rows of radial ball bearings equivalent thereto. In addition, the mass body does not need to be annular and requires no rotational balance. Therefore, an arbitrary outer shape of the mass body can be set in consideration of the installation space and the presence or absence of rotation around the rotary shaft.

According to the invention, while the action of an inertial force by the mass body is suppressed in the rotational direction of the rotary shaft, the inertial force of the mass body is caused to act in the translational direction other than the rotational direction. Also, the simple device is composed of the mass body and the support means for rotatably supporting the mass body with respect to the rotary shaft. Therefore, the compact and low-cost vibration damping device that can sufficiently exert the effect of suppressing bending vibrations or the like without having such an adverse influence as causes gear noise or gear whining on the compliance characteristic of the rotary shaft 11 in the rotational direction thereof can be provided.

Furthermore, the mass of the mass body is so set as to exert a mass effect in the vicinity of the bending resonance frequency as to vibrations in the translational direction other than the rotational direction of the driving-side gear shaft. Thus, the peak of vibrations of the power transmission device, which is determined by the vibration transmission sensitivity of the case in the vicinity of the end of the input shaft of the driving-side gear shaft, can be effectively reduced. As a result, the low-cost vehicular power transmission device capable of sufficiently reducing a vibration noise such as a whining noise or the like can be provided.

As described above, in the vibration damping device according to the invention, while the action of the inertial force in the rotational direction of the rotary shaft is minimized, the inertial force of the mass body is caused to act in the translational direction other than the rotational direction. Also, the device is simply composed of the mass body and the support means for rotatably supporting the mass body with respect to the rotary shaft in a certain posture. Therefore, there is achieved an effect of making it possible to provide the compact and low-cost vibration damping device capable of sufficiently exerting the effect of damping bending resonance or the like without having such an adverse influence as causes gear noise or gear whining on the compliance characteristic of the rotary shaft 11 in the rotational direction thereof. Accordingly, the invention is useful to a vibration damping device that damps vibrations in a bending direction of a rotary shaft through the use of an inertial mass, and to a power transmission device fitted with the vibration damping device in general.

While the embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A power transmission device for a motor vehicle, the power transmission device comprising:
a case
a driving-side gear shaft rotatably supported in the case, and into which a rotational power is input into the driving-side gear shaft, the driving-side gear shaft having a companion flange extending radially therefrom and rotationally integrally fitted to the driving-side gear shaft such that the companion flange rotates when the rotational power is inputted to the driving-side gear shaft;
a driven-side gear shaft accommodated in the case, the driven-side gear shaft meshes with the driving-side gear shaft and rotates in a decelerative manner;
an output shaft rotatably driven by the driven-side gear shaft; and
a vibration damping device having:
a mass body disposed spaced apart from a center axis of the driving-side gear shaft by a certain distance; and
a support portion that rotatably supports the mass body with respect to the companion flange of the driving-side gear shaft and holds a posture of the mass body with respect to the center axis of the driving-side gear shaft in an unrockable manner so that the mass body does not substantially apply an inertial force to the driving-side gear shaft in a direction of rotation of the driving-side gear shaft and substantially applies an inertial force to the driving-side gear shaft only in a translational direction other than the direction of the rotation of the driving-side gear shaft,
wherein the support portion is constituted by a bearing provided between the companion flange of the driving-side gear shaft and the mass body;
the bearing is constituted by a plurality of rolling members each of which is rollably supported on an outer periphery side of the companion flange of the driving-side gear shaft and rollably engaged with the mass body.

2. The power transmission device according to claim 1, wherein the mass body is annularly formed so as to surround the driving-side gear shaft.

3. The power transmission device according to claim 2, wherein the support portion retains the mass body in such a state that the mass body has the same center axis as the driving-side gear shaft.

4. The power transmission device according to claim 1, wherein the mass body has a center of gravity on the center axis of the driving-side gear shaft.

5. The vibration damping device according to claim 1, wherein the mass body has a center of gravity off the center axis of the driving-side gear shaft.

* * * * *